(12) United States Patent
McConville et al.

(10) Patent No.: US 6,620,757 B2
(45) Date of Patent: Sep. 16, 2003

(54) CATALYST SYSTEMS AND THEIR USE IN A POLYMERIZATION PROCESS

(75) Inventors: David H. McConville, Houston, TX (US); Matthew W. Holtcamp, Huffman, TX (US); Donald R. Loveday, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 10 days.

(21) Appl. No.: 10/057,417

(22) Filed: Jan. 25, 2002

(65) Prior Publication Data

US 2002/0082367 A1 Jun. 27, 2002

Related U.S. Application Data

(62) Division of application No. 09/460,179, filed on Dec. 10, 1999, now Pat. No. 6,380,328.

(51) Int. Cl.[7] .............................. B01J 31/38; C08F 4/44
(52) U.S. Cl. ...................... 502/104; 502/118; 502/132; 502/152; 502/167; 526/129; 526/161; 526/171; 526/160; 526/943
(58) Field of Search ................................. 526/160, 161, 526/171, 129, 943; 502/104, 152, 155, 167, 118, 132

(56) References Cited

U.S. PATENT DOCUMENTS

| 4,057,565 A | 11/1977 | Manzer ........................ 260/429 |
|---|---|---|
| 5,426,243 A | 6/1995 | Lecouve ...................... 568/737 |
| 5,637,660 A | 6/1997 | Nagy et al. .................. 526/160 |
| 5,707,913 A | 1/1998 | Schlund et al. ............. 502/102 |
| 5,726,115 A | 3/1998 | Horton et al. ............... 502/152 |
| 5,798,427 A | 8/1998 | Foster et al. ................. 526/352 |
| 5,889,128 A | 3/1999 | Schrock et al. ............. 526/107 |
| 6,194,341 B1 * | 2/2001 | Canich et al. .............. 502/113 |

FOREIGN PATENT DOCUMENTS

| EP | 0197310 A2 | 10/1986 |
|---|---|---|
| EP | 0197310 A3 | 10/1986 |
| EP | 0241560 A1 | 10/1987 |
| EP | 0751142 A2 | 1/1997 |
| EP | 0816372 A2 | 1/1998 |
| EP | 0816384 A3 | 1/1998 |
| EP | 0816384 A2 | 1/1998 |
| EP | 0803520 B1 | 12/1998 |
| EP | 0890575 A1 | 1/1999 |
| EP | 0893454 A1 | 1/1999 |
| JP | 02-78663 | 3/1990 |
| JP | 08-081415 | 7/1996 |
| JP | 08-277307 | 10/1996 |
| JP | 10-7712 | 1/1998 |
| JP | 10-45904 | 2/1998 |
| WO | WO 91/12285 | 8/1991 |
| WO | WO 92/12162 | 7/1992 |
| WO | WO 94/21700 | 9/1994 |
| WO | WO 96/08498 | 3/1996 |
| WO | WO 97/42197 | 11/1997 |
| WO | WO 97/45434 | 12/1997 |
| WO | WO 97/48735 | 12/1997 |
| WO | WO 97/48736 | 12/1997 |
| WO | WO 98/27124 | 6/1998 |
| WO | WO 98/30569 | 7/1998 |
| WO | WO 98/30612 | 7/1998 |
| WO | WO 98/34964 | 8/1998 |
| WO | WO 98/37109 | 8/1998 |
| WO | WO 98/46651 | 10/1998 |
| WO | WO 98/55467 | 12/1998 |
| WO | WO 99/02472 | 1/1999 |
| WO | WO 99/02536 | 1/1999 |
| WO | WO 99/12981 | 3/1999 |

OTHER PUBLICATIONS

*Organometallics*, Bei et al., vol. 16, pp. 3282–3302 (1997).
*Organometallics*, Grubbs, vol. 17, pp. 3149–3151 (1998).
*Macromolecules*, Repo, vol. 30, pp. 171–175 (1997).
*Polyhedron*, Guerin et al., vol. 17 (5–6), pp. 917–923 (1998).
*Inorganic Chemistry*, Furhman/Kempe et al., vol. 35, pp. 6742–6745 (1996).
*Organometallics*, Guerin et al., vol. 17 (23), pp. 5172–5177 (1998).
*Macromolecular Chemistry and Physics*, Silvestro et al., vol. 197, No. 10, pp. 3209–3228 (1996).
*Journal of Organometallic Chemistry*, Harkonen et al., vol. 519, No. 1, pp. 205–208 (1996).
*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Horton et al., vol. 15, pp. 2672–2674 (1996).
*Organometallics*, Guerin et al., vol. 15, pp. 5085–5089 (1996).

* cited by examiner

*Primary Examiner*—Robert D. Harlan
(74) *Attorney, Agent, or Firm*—Jaimes Sher; Lisa Kimes Jones; Kevin M. Faulkner

(57) ABSTRACT

The present invention relates to mixed catalyst system of a Group 15 containing metal catalyst compound, a bulky ligand metallocene-type catalyst compound, and a Lewis acid aluminum containing activator and to a supported version thereof and for their use in a process for polymerizing olefin(s).

10 Claims, 1 Drawing Sheet

CATALYST SYSTEMS AND THEIR USE IN A POLYMERIZATION PROCESS

RELATED APPLICATION DATA

The present application is a Divisional of U.S. patent application Ser. No. 09/460,179, filed on Dec. 10, 1999, now issued as U.S. Pat. No. 6,380,328.

FIELD OF THE INVENTION

The present invention relates to a catalyst system of Group 15 containing transition metal catalyst compound, a bulky ligand metallocene-type catalyst compound and a Lewis acid aluminum containing activator catalysts and its use in the polymerization of olefin(s).

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene-type catalyst systems.

More recently, developments have lead to the discovery of anionic, multidentate heteroatom ligands as discussed by the following articles: (1) Kempe et al., "Aminopyridinato Ligands—New Directions and Limitations", 80$^{th}$ Canadian Society for Chemistry Meeting, Windsor, Ontario, Canada, Jun. 1–4, 1997; (2) Kempe et al., *Inorg. Chem.* 1996 vol 35 6742; (3) Jordan et al. of polyolefin catalysts based on hydroxyquinolines (Bei, X.; Swenson, D. C.; Jordan, R. F., *Organometallics* 1997, 16, 3282); (4) Horton, et.al., "Cationic Alkylzirconium Complexes Based on a Tridentate Diamide Ligand: New Alkene Polymerization Catalysts", Organometallics, 1996, 15, 2672–2674 relates to tridentate zirconium complexes; (5) Baumann, et al., "Synthesis of Titanium and Zirconium Complexes that Contain the Tridentate Diamido Ligand [((t-Bu-d$_6$)N—O—C$_6$H$_4$)$_2$O]$^{2-}$ {[NON}$^{2-}$) and the Living Polymerization of 1-Hexene by A [NON]ZrMe2", Journal of the American Chemical Society, Vol. 119, pp. 3830–3831; (6) Cloke et al., "Zirconium Complexes incorporating the New Tridentate Diamide Ligand [(Me$_3$Si)N{CH$_2$CH$_2$N(SiMe$_3$)}$_2$]$^{2-}$(L); the Crystal Structure of [Zr(BH$_4$)$_2$L] and [ZrCl{CH(SiMe$_3$)$_2$}L]", J. Chem. Soc. Dalton Trans, pp. 25–30, 1995; (7) Clark et al., "Titanium (IV) complexes incorporating the aminodiamide ligand [(SiMe$_3$)N{CH$_2$CH$_2$N (SiMe$_3$)}$_2$]$^{2-}$(L); the X-ray crystal structure of [TiMe$_2$(L)] and [TiCl{CH(SiMe$_3$)$_2$}(L)]", Journal of Organometallic Chemistry, Vol 50, pp. 333–340, 1995; (8) Scollard et al., "Living Polymerization of alpha-olefins by Chelating Diamide Complexes of Titanium", J. Am. Chem. Soc., Vol 118, No. 41, pp. 10008–10009, 1996; and (9) Guerin et al., "Conformationally Rigid Diamide Complexes: Synthesis and Structure of Titanium (IV) Alkyl Derivatives", Organometallics, Vol 15, No. 24, pp. 5085–5089, 1996.

Furthermore, U.S. Pat. No. 5,576,460 describes a preparation of arylamine ligands and U.S. Pat. No. 5,889,128 discloses a process for the living polymerization of olefins using initiators having a metal atom and a ligand having two group 15 atoms and a group 16 atom or three group 15 atoms. EP 893 454 A1 also describes preferably titanium transition metal amide compounds. In addition, U.S. Pat. No. 5,318,935 discusses amido transition metal compounds and catalyst systems especially for the production of isotactic polypropylene. Polymerization catalysts containing bidentate and tridentate ligands are further discussed in U.S. Pat. No. 5,506,184.

Traditional bulky ligand metallocene-type catalyst systems produce polymers that are in some situations more difficult to process into film, for example using old extrusion equipment. One technique to improve these polymers is to blend them with other polymers with the intent to create a blend having the desired properties that each component individually would have. While the two polymer blends tend to be more processable, it is expensive and adds a cumbersome blending step to the manufacturing/fabrication process.

Higher molecular weight confers desirable polymer mechanical properties and stable bubble formation in the production of films. However, this property also inhibits extrusion processing by increasing backpressure in extruders, promotes melt fracture defects in the inflating bubble and potentially, promotes too high a degree of orientation in the finished film. The anionic, multidentate heteroatom containing catalyst systems tend to produce a very high molecular weight polymer. To remedy this, one may form a secondary, minor component of lower molecular weight polymer to reduce extruder backpressure and inhibit melt fracture. Several industrial processes operate on this principle using multiple reactor technology to produce a processable bimodal molecular weight distribution (MWD) high density polyethylene (HDPE) product. HIZEX™, a Mitsui Chemicals HDPE product, is considered the worldwide standard. HIZEX™ is produced in a costly two or more reactor process. In a multiple reactor process, each reactor produces a single component of the final product.

Others in the art have tried to produce two polymers together at the same time in the same reactor using two different catalysts. PCT patent application WO 99/03899 discloses using a typical bulky ligand metallocene-type catalyst and a conventional-type Ziegler-Natta catalyst in the same reactor to produce a bimodal polyolefin. Using two different types of catalysts, however, result in a polymer whose characteristics cannot be predicted from those of the polymers that each catalyst would produce if utilized separately. This unpredictability occurs, for example, from competition or other influence between the catalyst or catalyst systems used.

Polyethylenes with a higher density and a higher molecular weight are valued in film applications requiring high stiffness, good toughness and high throughput. Such polymers are also valued in pipe applications requiring stiffness, toughness and long-term durability, and particularly resistance to environmental stress cracking.

Thus, there is a desire for a combination of catalysts capable of producing processable polyethylene polymers in preferably a single reactor having desirable combinations of processing, mechanical and optical properties.

SUMMARY OF THE INVENTION

This invention provides for an improved catalyst compound, a catalyst system and for its use in a polymerizing process.

In one embodiment, the invention is directed to a catalyst system including a Group 15 containing catalyst compound and a bulky ligand metallocene-type catalyst compound, and a Lewis acid activator and to its use in the polymerization of olefin(s).

In another embodiment, the invention is directed to a catalyst system of a Group 15 containing bidentate or tridentate ligated transition metal catalyst compound and a bulky ligand metallocene-type catalyst compound and a Lewis acid aluminum containing activator and to its use in the polymerization of olefin(s).

In another embodiment, the invention is directed to a catalyst system of a catalyst compound having a transition metal bound to at least one leaving group and also bound to at least two Group 15 atoms, at least one of which is also bound to a Group 15 or 16 atom through another group, a bulky ligand metallocene-type catalyst compound and a Lewis acid aluminum containing activator and to its use in the polymerization of olefin(s).

In still another embodiment, the invention is directed to a method for supporting a catalyst system of a multidentate ligated transition metal based catalyst compound, a bulky ligand metallocene-type catalyst compound and a Lewis acid activator, preferably a Lewis acid aluminum containing activator on the same or different supports; to the supported catalyst system itself; and to their use in the polymerization of olefin(s), particularly in a slurry or gas phase process.

In another embodiment, the invention is directed to a process for polymerizing olefin(s), particularly in a gas phase or slurry phase process, utilizing any one of the catalyst systems or supports catalyst systems discussed above, more preferably in a continuous gas phase single reactor process producing a multimodal polymer.

DETAILED DESCRIPTION OF THE INVENTION

Introduction

Figure 1:
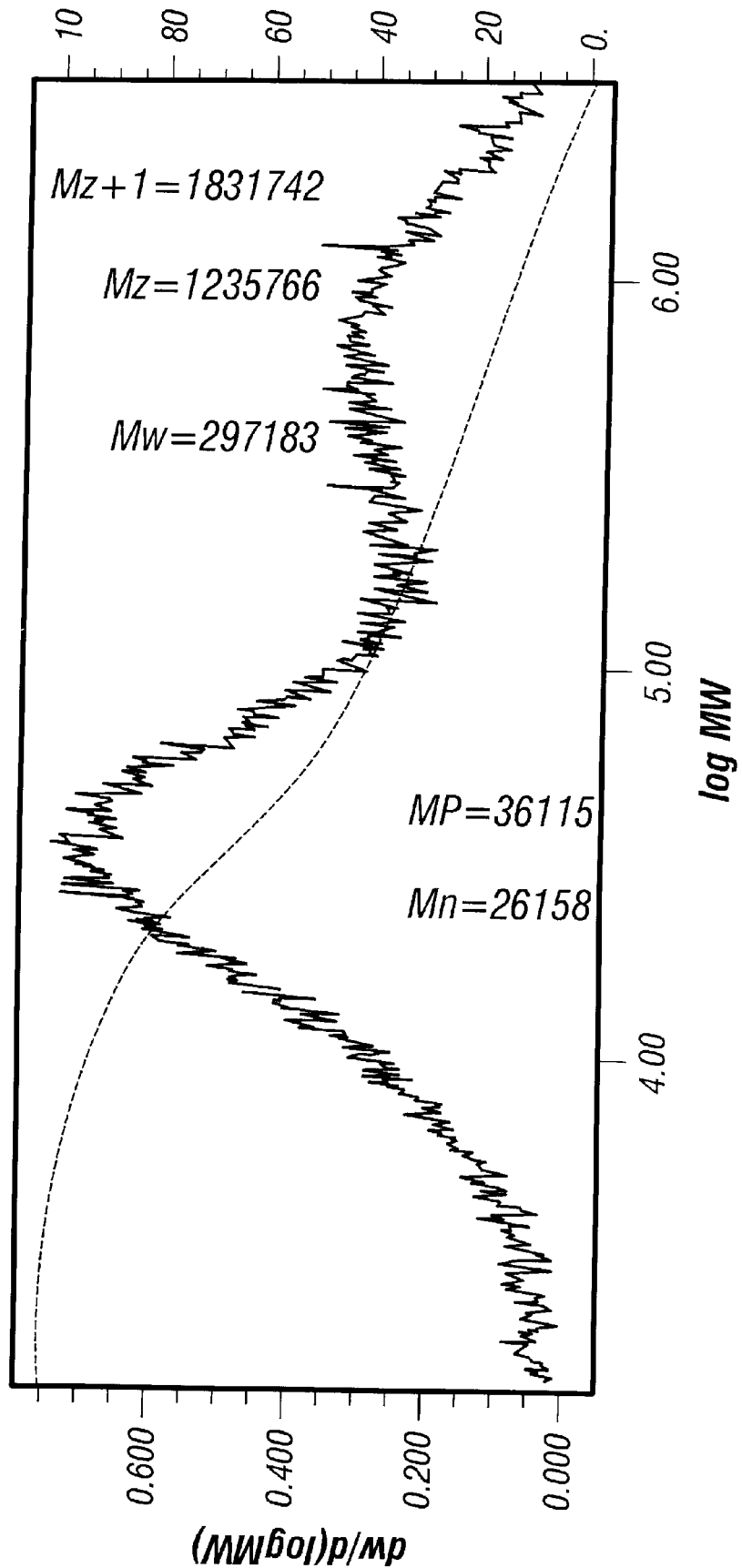
FIG. 1 is a gel permeation chromatogram representative of the polymers of the invention.

It has been found that the Group 15 containing transition metal catalyst compounds have a very high activity and typically produce in a polymerization process a polymer having a very high molecular weight. Bulky ligand metallocene-type catalysts typically have a high catalyst productivity and generally produce polymers having a lower molecular weight. It is also been found that using a Lewis acid aluminum containing activator results in a catalyst system that exhibits commercially acceptable productivity with excellent operability. As a result of this discovery it is now possible to provide for a mixed catalyst system that produces in a polymerization process a multimodal, especially a bimodal, polymer having a high molecular weight and a low molecular weight component. It was surprising that the these two different catalyst compounds activated by a Lewis acid containing activator would perform together in this independent way, especially in a gas phase or slurry phase polymerization process, and in particular when the catalyst system is supported on a support material.

Group 15 Containing Metal Catalyst Compound and Catalyst Systems

In one embodiment, the metal based catalyst compounds of the invention are Group 15 bidentate or tridentate ligated transition metal compound having at least one substituted hydrocarbon group, the preferred Group 15 elements are nitrogen and/or phosphorous, most preferably nitrogen, and the preferred leaving group is a substituted alkyl group having greater than 6 carbon atoms, preferably the alkyl substituted with an aryl group.

The Group 15 containing metal catalyst compounds of the invention generally include a transition metal atom bound to at least one substituted hydrocarbon leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group, which may be a hydrocarbon group, preferably a hydrocarbon group having 1 to 20 carbon atoms, a heteroatom containing group, preferably silicon, germanium, tin, lead, or phosphorus. In this embodiment, it is further preferred that the Group 15 or 16 atom be bound to nothing or a hydrogen, a Group 14 atom containing group, a halogen, or a heteroatom containing group. Additionally in these embodiment, it is preferred that each of the two Group 15 atoms are also bound to a cyclic group that may optionally be bound to hydrogen, a halogen, a heteroatom or a hydrocarbyl group, or a heteroatom containing group.

In an embodiment of the invention, the Group 15 containing metal compound of the invention is represented by the formulae:

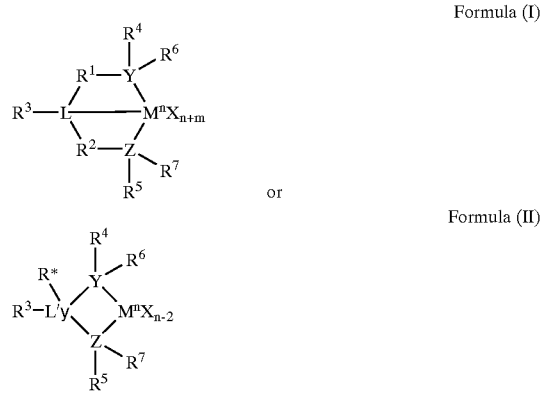

Formula (I)

Formula (II)

wherein M is a metal, preferably a transition metal, more preferably a Group 4, 5 or 6 metal, even more preferably a Group 4 metal, and most preferably hafnium or zirconium; each X is independently a leaving group, preferably, an anionic leaving group, and more preferably hydrogen, a hydrocarbyl group, a heteroatom (silyl, germyl stannyl groups and the like), and most preferably an alkyl. In a most preferred embodiment, at least one X is a substituted hydrocarbon group, preferably a substituted alkyl group having more than 6 carbon atoms, more preferably an aryl substituted alkyl group and most preferably a benzyl group.
y is 0 or 1 (when y is 0 group L' is absent);
n is the oxidation state of M, preferably +2, +3, +4 or +5 and more preferably +4;
m is the formal charge of the YZL or the YZL' ligand, preferably 0, −1, −2 or −3, and more preferably −2;
L is a Group 15 or 16 element, preferably nitrogen;
L' is a Group 15 or 16 element or Group 14 containing group, preferably carbon, silicon or germanium;
Y is a Group 15 element, preferably nitrogen or phosphorus, and more preferably nitrogen;
Z is a Group 15 element, preferably nitrogen or phosphorus, and more preferably nitrogen;

$R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or arylalkyl group, more preferably a linear, branched or cyclic $C_2$ to $C_{20}$ alkyl group, most preferably a $C_2$ to $C_6$ hydrocarbon group;

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen;

$R^4$ and $R^5$ are independently an alkyl group, an aryl group, substituted aryl group, a cyclic alkyl group, a substituted cyclic alkyl group, a cyclic arylalkyl group, a substituted cyclic arylalkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ arylalkyl group, or a heteroatom containing group, for example $PR_3$ where R is an alkyl group;

$R^1$ and $R^2$ may be interconnected to each other, and/or $R^4$ and $R^5$ may be interconnected to each other;

$R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent; and $R^*$ is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An arylalkyl group is defined to be a substituted aryl group.

In a preferred embodiment $R^4$ and $R^5$ are independently a group represented by the following formula:

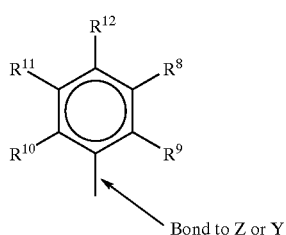

Formula (III)

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

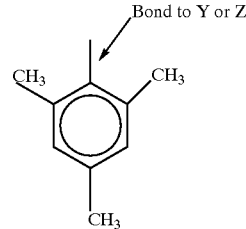

Formula (IV)

In this embodiment, M is hafnium or zirconium; each of L, Y, and Z is nitrogen; each of $R^1$ and $R^2$ is a hydrocarbyl group, preferably —$CH_2$—$CH_2$—; $R^3$ is hydrogen; and $R^6$ and $R^7$ are absent.

The Group 15 containing metal catalyst compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. application Ser. No. 09/312,878, filed May 17, 1999, discloses a gas or slurry phase polymerization process using a supported bisamide catalyst, which is also incorporated herein by reference. A preferred direct synthesis of these compounds comprises reacting the neutral ligand, (see for example YZL or YZL' of Formula I or II) with $MX_n$, n is the oxidation state of the metal, each X is an anionic group, such as halide, in a non-coordinating or weakly coordinating solvent, such as ether, toluene, xylene, benzene, methylene chloride, and/or hexane or other solvent having a boiling point above 60° C., at about 20° C. to about 150° C. (preferably 20° C. to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal catalyst compound is prepared by a method comprising reacting a neutral ligand, (see for example YZL or YZL' of formula 1 or 2) with a compound represented by the formula $MX_n$ (where n is the oxidation state of M, M is a transition metal, and each X is an anionic leaving group) in a non-coordinating or weakly coordinating solvent, at about 20° C. or above, preferably at about 20° C. to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably η⁵-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably η³-bonding to M and most preferably η⁵-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L_B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound.

Non-limiting examples of preferred Q ligands include hydrides, hydrocarbyls, silyls, germyls, scannyl's, dienes, alkylidenes and carbenes. Most preferably the Q ligand is a hydrocarbyl radical having from 1 to 20 carbon atoms or a hydride.

In one embodiment, the bulky ligand metallocene-type catalyst compounds of the invention include those of formula (I) where $L^A$ and $L^B$ are bridged to each other by at least one bridging group, A, such that the formula is represented by:

$$L^A A L^B MQ_n \qquad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (II) have two or more bridging groups A (EP 664 301 B1).

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the bulky ligand metallocene-type catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B 1-0 735 057, all of which are herein fully incorporated by reference.

In an embodiment, the bulky ligand metallocene-type catalyst compound is represented by the formula:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene-type catalyst compounds are those described in PCT publications WO 99/01481 and WO 98/42664, which are fully incorporated herein by reference.

In one embodiment, the bulky ligand metallocene-type catalyst compound is represented by the formula:

$$((Z)XA_t(YJ))_qMQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also contemplated that in one embodiment, the bulky ligand metallocene-type catalysts of the invention described above include their structural or optical or enantiomeric isomers (meso and racemic isomers, for example see U.S. Pat. No. 5,852,143, incorporated herein by reference) and mixtures thereof.

Activator and Activation Methods

The above described Group 15 containing metal catalyst compound and bulky ligand metallocene-type catalysts compounds are typically activated in various ways to yield catalyst compounds having a vacant coordination site that will coordinate, insert, and polymerize olefin(s).

The preferred activator is a Lewis acid compound, more preferably an aluminum based Lewis acid compound, and most preferably a neutral, aluminum based Lewis acid compound having at least one, preferably two, halogenated aryl ligands and one or two additional monoanionic ligands not including halogenated aryl ligands.

The Lewis acid compounds of the invention include those olefin catalyst activator Lewis acids based on aluminum and having at least one bulky, electron-withdrawing ancillary ligand such as the halogenated aryl ligands of tris (perfluorophenyl)borane or tris(perfluoronaphthyl)borane. These bulky ancillary ligands are those sufficient to allow the Lewis acids to function as electronically stabilizing, compatible non-coordinating anions. Stable ionic complexes are achieved when the anions will not be a suitable ligand donor to the strongly Lewis acidic cationic Group 15 containing transition metal cations used in insertion polymerization, i.e., inhibit ligand transfer that would neutralize the cations and render them inactive for polymerization.

The Lewis acids fitting this description can be described by the following formula:

$$R_nAl(ArHal)_{3-n}, \qquad (V)$$

where R is a monoanionic ligand and ArHal is a halogenated $C_6$ aromatic or higher carbon number polycyclic aromatic hydrocarbon or aromatic ring assembly in which two or more rings (or fused ring systems) are joined directly to one another or together, and n=1 to 2, preferably n=1.

In one embodiment, at least one (ArHal) is a halogenated $C_9$ aromatic or higher, preferably a fluorinated naphtyl. Suitable non-limiting R ligands include: substituted or unsubstituted $C_1$ to $C_{30}$ hydrocarbyl aliphatic or aromatic groups, substituted meaning that at least one hydrogen on a carbon atom is replaced with a hydrocarbyl, halide, halocarbyl, hydrocarbyl or halocarbyl substituted organometalloid, dialkylamido, alkoxy, siloxy, aryloxy, alkysulfido, arylsulfido, alkylphosphido, alkylphosphido or other anionic substituent; fluoride; bulky alkoxides, where bulky refers to $C_4$ and higher number hydrocarbyl groups, e.g., up to about $C_{20}$, such as tert-butoxide and 2,6-dimethyl-phenoxide, and 2,6-di(tert-butyl)phenoxide; —SR; —NR$_2$, and —PR$_2$, where each R is independently a substituted or unsubstituted hydrocarbyl as defined above; and, $C_1$ to $C_{30}$ hydrocarbyl substituted organometalloid, such as trimethyl-silyl.

Examples of ArHal include the phenyl, napthyl and anthracenyl radicals of U.S. Pat. No. 5,198,401 and the biphenyl radicals of WO 97/29845 when halogenated. The use of the terms halogenated or halogenation means for the purposes of this application that at least one third of hydrogen atoms on carbon atoms of the aryl-substituted aromatic ligands are replaced by halogen atoms, and more preferred that the aromatic ligands be perhalogenated. Fluorine is the most preferred halogen.

Other activators or methods of activation are contemplated for use with the aluminum based Lewis acid activators. For example other activators include: alumoxane, modified alumoxane, tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions, trimethylaluminum, triethylaluminum, triisobutylaluminum, tri-n-hexylaluminum, tri-n-octylaluminum, tris (2,2',2''-nona-fluorobiphenyl) fluoroaluminate, perchlorates, periodates, iodates and hydrates, (2,2'-bisphenyl-ditrimethylsilicate)•4THF and organo-boron-aluminum compound, silylium salts and dioctadecylmethylammonium-bis(tris(pentafluorophenyl) borane)-benzimidazolide.

It is further contemplated by the invention that other catalysts including bulky ligand metallocene-type catalyst compounds and/or conventional-type catalyst compounds can be combined with the Group 15 containing metal catalyst compounds of this invention. It is also contemplated that in addition to the Lewis acid aluminum containing activator that other activators such as alumoxane, modified alumoxane, organoaluminum compounds such as trimethylaluminum, triethylaluminum, triisobutylaluminum, tri-n-hexylaluminum, tri-n-octylaluminum and the like, or a combination thereof, may be used.

It is further contemplated by the invention that a conventional-type catalyst compound can be combined with the Group 15 containing metal catalyst compounds and the bulky ligand metallocene-type catalyst compounds of this invention.

Supports, Carriers and General Supporting Techniques

The above described catalyst systems of a Group 15 containing metal catalyst compound, a bulky ligand metallocene-type catalyst compound and a Lewis acid aluminum containing activator may be combined with one or more support materials or carriers using one of the support methods well known in the art or as described below. For example, in a most preferred embodiment, a Group 15 containing metal catalyst compound, a bulky ligand metallocene-type catalyst compound and Lewis acid activator is in a supported form, for example deposited on, contacted with, vaporized with, bonded to, or incorporated within, adsorbed or absorbed in, or on, a support or carrier.

The R group in formula (V) above, or ligand, may also be a covalently bonded to a support material, preferably a metal/metalloid oxide or polymeric support. Lewis base-containing support materials or substrates will react with the Lewis acid activators to form a support bonded Lewis acid compound, a supported activator, where one R group of $R_nAl(ArHal)_{3-n}$ is covalently bonded to the support material. For example, where the support material is silica, the Lewis base hydroxyl groups of the silica is where this method of bonding at one of the aluminum coordination sites occurs.

In a preferred embodiment, the support material is a metal or metalloid oxide, preferably having surface hydroxyl groups exhibiting a $pK_a$ equal to or less than that observed for amorphous silica, i.e., $pK_a$ less than or equal to about 11.

While not wishing to be bound to any particular theory, it is believed that the covalently bound anionic activator, the Lewis acid, is believed to form initially a dative complex with a silanol group, for example of silica (which acts as a Lewis base), thus forming a formally dipolar (zwitterionic) Bronsted acid structure bound to the metal/metalloid of the metal oxide support. Thereafter, the proton of the Bronsted acid appears to protonate an R-group of the Lewis acid, abstracting it, at which time the Lewis acid becomes covalently bonded to the oxygen atom. The replacement R group of the Lewis acid then becomes R'—O—, where R' is a suitable support material or substrate, for example, silica or hydroxyl group-containing polymeric support. Any support material that contain surface hydroxyl groups are suitable for use in this particular supporting method. Other support material include glass beads.

In one embodiment where the support material is a metal oxide composition, these compositions may additionally contain oxides of other metals, such as those of Al, K, Mg, Na, Si, Ti and Zr and should preferably be treated by thermal and/or chemical means to remove water and free oxygen. Typically such treatment is in a vacuum in a heated oven, in a heated fluidized bed or with dehydrating agents such as organo silanes, siloxanes, alkyl aluminum compounds, etc. The level of treatment should be such that as much retained moisture and oxygen as is possible is removed, but that a chemically significant amount of hydroxyl functionality is retained. Thus calcining at up to 800° C. or more up to a point prior to decomposition of the support material, for several hours is permissible, and if higher loading of supported anionic activator is desired, lower calcining temperatures for lesser times will be suitable. Where the metal oxide is silica, loadings to achieve from less than 0.1 mmol to 3.0 mmol activator/g $SiO_2$ are typically suitable and can be achieved, for example, by varying the temperature of calcining from 200 to 800+° C. See Zhuralev, et al, Langmuir 1987, Vol. 3, 316 where correlation between calcining temperature and times and hydroxyl contents of silica's of varying surface areas is described.

The tailoring of hydroxyl groups available as attachment sites can also be accomplished by the pre-treatment, prior to addition of the Lewis acid, with a less than stoichiometric amount of the chemical dehydrating agents. Preferably those used will be used sparingly and will be those having a single ligand reactive with the silanol groups (e.g., $(CH_3)_3SiCl$), or otherwise hydrolyzable, so as to minimize interference with the reaction of the transition metal catalyst compounds with the bound activator. If calcining temperatures below 400° C. are employed, difunctional coupling agents (e.g., $(CH_3)_2SiCl_2$) may be employed to cap hydrogen bonded pairs of silanol groups which are present under the less severe calcining conditions. See for example, "Investigation of Quantitative SiOH Determination by the Silane Treatment of Disperse Silica", Gorski, et al, Journ. of Colloid and Interface Science, Vol. 126, No. 2, December 1988, for discussion of the effect of silane coupling agents for silica polymeric fillers that will also be effective for modification of silanol groups on the catalyst supports of this invention. Similarly, use of the Lewis acid in excess of the stoichiometric amount needed for reaction with the transition metal compounds will serve to neutralize excess silanol groups without significant detrimental effect for catalyst preparation or subsequent polymerization.

Polymeric supports are preferably hydroxyl-functional-group-containing polymeric substrates, but functional groups may be any of the primary alkyl amines, secondary alkyl amines, and others, where the groups are structurally incorporated in a polymeric chain and capable of a acid-base reaction with the Lewis acid such that a ligand filling one coordination site of the aluminum is protonated and replaced by the polymer incorporated functionality. See, for example, the functional group containing polymers of U.S. Pat. No. 5,288,677, which is herein incorporated by reference.

Other supports include silica, alumina, silica-alumina, magnesia, titania, zirconia, magnesium chloride, montmorillonite, phyllosilicate, zeolites, talc, clays, silica-chromium, silica-alumina, silica-titania, porous acrylic polymers.

In one embodiment, the support material or carrier, most preferably an inorganic oxide has a surface area in the range of from about 10 to about 100 $m^2/g$, pore volume in the range of from about 0.1 to about 4.0 cc/g and average particle size in the range of from about 5 to about 500 $\mu m$. More preferably, the surface area of the carrier is in the range of from about 50 to about 500 $m^2/g$, pore volume of from about 0.5 to about 3.5 cc/g and average particle size of from about 10 to about 200 $\mu m$. Most preferably the surface area of the carrier is in the range is from about 100 to about 400 $m^2/g$, pore volume from about 0.8 to about 5.0 cc/g and average particle size is from about 5 to about 100 $\mu m$. The average pore size of the carrier of the invention typically has pore size in the range of from 10 to 1000 Å, preferably 50 to about 500 Å, and most preferably 75 to about 450 Å.

There are various other methods in the art for supporting a polymerization catalyst compound or catalyst system of the invention.

In a preferred embodiment, the invention provides for a Group 15 containing metal catalyst compound, a bulky ligand metallocene-type catalyst compound, and the Lewis acid aluminum activator includes a surface modifier that is used in the preparation of the supported catalyst system as described in PCT publication WO 96/11960, which is herein fully incorporated by reference. The catalyst systems of the invention can be prepared in the presence of an olefin, for example hexene-1.

In a preferred embodiment, the mixed catalyst system can be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998.

A preferred method for producing a supported Group 15 containing metal catalyst, a bulky ligand metallocene-type catalyst and a Lewis acid aluminum activator catalyst system is described below and is described in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the Group 15 containing metal catalyst compound and/or separately the bulky ligand metallocene-type catalyst compound is slurried in a liquid to form a solution and a separate solution is formed containing a Lewis acid activator and a liquid. The liquid may be any compatible solvent or other liquid capable of forming a solution or the like with the Group 15 containing metal catalyst compounds and or bulky ligand metallocene-type catalyst compounds and/or Lewis acid activators. In the most preferred embodiment the liquid is a cyclic aliphatic or aromatic hydrocarbon, most preferably toluene. The Group 15 containing metal catalyst compounds and/or the bulky ligand metallocene-type catalyst compounds and Lewis acid activator solutions are mixed together and added to a porous support such that the total volume of Group 15 containing metal catalyst compound solution and/or a bulky ligand metallocene-type catalyst compound and the Lewis acid activator solution or the Group 15 containing metal catalyst compound solution and Lewis acid activator solution or the bulky ligand metallocene-type catalyst compound solution or the combined catalyst compound solutions is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

In another embodiment of the invention, a Group 15 containing metal catalyst compound and a Lewis acid aluminum containing activator is supported on one support material and the bulky ligand metallocene-type catalyst compound and the Lewis acid aluminum containing activators is supported on a second support material, and the two are introduced into the reactor simultaneously, separately, or combined. In this embodiment, it would be preferably that the support materials be the same. In an alternative embodiment, in only one of the separately supported systems, the bulky ligand metallocene-type catalyst compound or the Group 15 containing metal catalyst compound is activated with alumoxane or the like replacing the Lewis acid aluminum containing activator.

The mole ratio of the metal of the activator component to the metal component of the Group 15 containing metal catalyst compound is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

Polymerization Process

The catalyst systems, supported catalyst systems of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference A preferred process of the invention is where the process, preferably a slurry or gas phase process is operated in the presence of mixed catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In an embodiment, the method of the invention provides for injecting an unsupported mixed catalyst system into a reactor, particularly a gas phase reactor. In one embodiment the polymerization catalysts of the invention are used in the unsupported form, preferably in a liquid form such as described in U.S. Pat. Nos. 5,317,036 and 5,693,727 and European publication EP-A-0 593 083, all of which are herein incorporated by reference. The polymerization catalyst or catalyst(s) in liquid form can be fed with an activator together or separately to a reactor using the injection methods described in PCT publication WO 97/46599, which is fully incorporated herein by reference.

The hydrogen concentration in the reactor is about 100 to 5000 ppm, preferably 200 to 2000 ppm, more preferably 250 to 1900 ppm, more preferably 300 to 1800 ppm, and more preferably 350 to 1700 ppm, more preferably 400 to 1600 ppm, more preferably 500 to 1500 ppm, more preferably 500 to 1400 ppm, more preferably 500 to 1200 ppm, more preferably 600 to 1200 ppm, preferably 700 to 1100 ppm, and more preferably 800 to 1000 ppm. The hydrogen concentration in the reactor being inversely proportional to the polymer's weight average molecular weight ($M_w$).

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers. Preferably the new polymers include polyethylene, and even more preferably include bimodal polyethylene produced in a single reactor. In addition to bimodal polymers, it is not beyond the scope of the present application to produce a unimodal or multimodal polymer.

The polyolefins, particularly polyethylenes, produced by the present invention, have a density of 0.89 to 0.97 $g/cm^3$. Preferably, polyethylenes having a density of 0.910 to 0.965 $g/cm^3$, more preferably 0.915 to 0.960 $g/cm^3$, and even more preferably 0.920 to 0.955 $g/cm^3$ can be produced. In some embodiments, a density of 0.915 to 0.940 $g/cm^3$ would be preferred, in other embodiments densities of 0.930 to 0.970 $g/cm^3$ are preferred. Density is measured in accordance with ASTM-D-1238.

The polymers produced by the process of the invention typically have a molecular weight distribution, a weight average molecular weight to number average molecular weight ($M_w/M_n$) of greater than 5, particularly greater than 10.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

In another embodiment, polymers produced using a catalyst system of the invention have a CDBI less than 50%, more preferably less than 40%, and most preferably less than 30%.

In a preferred embodiment, the polyolefin recovered typically has a melt index $I_2$ (as measured by ASTM D-1238, Condition E at 190° C.) of about 0.01 to 1000 dg/min or less. In a preferred embodiment, the polyolefin is ethylene homopolymer or copolymer. In a preferred embodiment for certain applications, such as films, pipes, molded articles and the like, a melt index of 10 dg/min or less is preferred. For some films and molded articles, a melt index of 1 dg/min or less is preferred. Polyethylene having a $I_2$ between 0.01 and 10 dg/min is preferred.

In a preferred embodiment the polymer produced herein has an $I_{21}$ (as measured by ASTM-D-1238-F, at 190° C.) of 0.1 to 100 dg/min, preferably 0.5 dg/min to 50 dg/min, more preferably 2 dg/min to 20 dg/min (especially for pipe applications), and most preferably for film applications from 5 dg/min to 10 dg/min.

The polymers of the invention in a preferred embodiment have a melt index ratio ($I_{21}/I_2$) ($I_{21}$ is measured by ASTM-D-1238-F) of from preferably greater than 80, more preferably greater than 90, even more preferably greater that 100, still even more preferably greater than 110 and most preferably greater than 120.

The Group 15 containing metal compound, when used alone, produces a high weight average molecular weight Mw polymer such as for example above 100,000, preferably above 150,000, preferably above 200,000, preferably above 250,000, more preferably above 300,000).

The bulky ligand metallocene-type catalyst compound, when use alone produces a low weight average molecular weight polymer such as for example below 100,000, preferably below 80,000, more preferably below 60,000, still more preferably below 50,000, still even more preferably below 40,000, and most preferably less than 30,000 and greater than 5,000.

In another embodiment the polymer has one or more of the following properties in addition to a combination of those above:

(a) $M_w/M_n$ of between 15 and 80, preferably between 20 and 60, preferably between 20 and 40. Molecular weight ($M_w$ and $M_n$) are measured as described below in the examples section;

(b) a density (as measured by ASTM 2839) of 0.94 to 0.970 g/cm$^3$; preferably 0.945 to 0.965 g/cm$^3$; preferably 0.945 g/cm$^3$ to 0.960 g/cm$^3$;

(c) a residual metal content of 5.0 ppm transition metal or less, preferably 2.0 ppm transition metal or less, preferably 1.8 ppm transition metal or less, preferably 1.6 ppm transition metal or less, preferably 1.5 ppm transition metal or less, preferably 2.0 ppm or less of Group 4 metal, preferably 1.8 ppm or less of Group 4 metal, preferably 1.6 ppm or less of Group 4 metal, preferably 1.5 ppm or less of Group 4 metal (as measured by Inductively Coupled Plasma Emission Spectroscopy (ICPES) run against commercially available standards, where the sample is heated so as to fully decompose all organics and the solvent comprises nitric acid and, if any support is present, another acid to dissolve any support (such as hydrofluoric acid to dissolve silica supports) is present; and/or (d) 35 weight percent or more high weight average molecular weight component, as measured by size-exclusion chromatography, preferably 40% or more. In a particularly preferred embodiment the higher molecular weight fraction is present at between 35 and 70 weight %, more preferably between 40 and 60 weight %.

In one preferred embodiment the catalyst composition described above is used to make a polyethylene having a density of between 0.94 and 0.970 g/cm$^3$ (as measured by ASTM D 2839) and an $I_2$ of 0.5 or less g/10 min or less. In another embodiment the catalyst composition described above is used to make a polyethylene having an $I_{21}$ of less than 10 and a density of between about 0.940 and 0.950 g/cm$^3$ or an $I_{21}$ of less than 20 and a density of about 0.945 g/cm$^3$ or less.

In another embodiment, the polymers of the invention, including those described above, have an ash content less than 100 ppm, more preferably less than 75 ppm, and even more preferably less than 50 ppm is produced. In another embodiment, the ash contains negligibly small levels, trace amounts, of titanium as measured by Inductively Coupled Plasma/Atomic Emission Spectroscopy (ICPAES) as is well known in the art.

The polymers of the invention may be blended and/or coextruded with any other polymer. Non-limiting examples of other polymers include linear low density polyethylenes, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The following examples below use the bulky ligand metallocene-type catalyst compound (dimethylsilylbis(3-n-propylcyclopentadienyl)zirconium dichloride (DMSP-Cl$_2$)), which was obtained from Boulder Scientific, Meade, Colo. Synthesis of Al(C$_6$F$_5$)$_3$.toluene was prepared in accordance with method of described in EP 0 694 548 A1, which is fully incorporated by reference.

Example 1

Preparation of [(2,4,6-Me$_3$C$_6$H$_2$)NHCH$_2$CH$_2$]$_2$NH ligand

A 2 L one-armed Schlenk flask was charged with a magnetic stir bar, diethylenetriamine (23.450 g, 0.227 mol), 2-bromomesitylene (90.51 g, 0.455 mol), tris (dibenzylideneacetone)dipalladium (1.041 g, 1.14 mmol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100° C. After 18 h the reaction was complete, as judged by proton NMR spectroscopy. All remaining manipulations can be performed in air. All solvent was removed under vacuum and the residues dissolved in diethyl ether (1 L). The ether was washed with water (3 times 250 mL) followed by saturated aqueous NaCl (180 g in 500 mL) and dried over magnesium sulfate (30 g). Removal of the ether in vacuo yielded a red oil which was dried at 70° C. for 12 h under vacuum (yield: 71.10 g, 92%). $^1$H NMR ($C_6D_6$) δ 6.83 (s, 4), 3.39 (br s, 2), 2.86 (t, 4), 2.49 (t, 4), 2.27 (s, 12), 2.21 (s, 6), 0.68 (br s, 1).

Example 2

Preparation of $\{[(2,4,6-Me_3C_6H_2)NCH_2CH_2]_2NH\}Hf(CH_2Ph)_2$ (Hf—HN$_3$)

A 250 mL round bottom flask was charged with a magnetic stir bar, tetrabenzyl hafnium (4.063 g, 7.482 mmol), and 150 mL of toluene under dry, oxygen-free nitrogen. Solid triamine ligand above (2.545 g, 7.495 mmol) was added with stirring over 1 minute (the desired compound precipitates). The volume of the slurry was reduced to 30 mL and 120 mL of pentane added with stirring. The solid pale yellow product was collected by filtration and dried under vacuum (4.562 g, 87% yield). $^1$H NMR ($C_6D_6$) δ7.21–6.79 (m, 12), 6.16 (d, 2), 3.39 (m, 2), 3.14 (m, 2), 2.65 (s, 6), 2.40 (s, 2), 2.35 (m, 2), 2.23 (m, 2), 2.19 (s, 6) 1.60 (s, 2), 1.26 (s, 2), NH obscured.

Example 3

Preparation of Dimethylsilylbis(3-n-propylcyclopentadienyl)zirconium Dimethyl (DMSP-Me$_2$)

A 250 mL round bottom flask was charged with a magnetic stir bar, 5.990 g of DMSP-Cl$_2$ (13.84 mmol) and 125 mL of diethyl ether. The solution was cooled to –30° C. and 20.3 mL of MeLi (1.4 M in ether, 28.42 mmol) added dropwise with stirring over 5 minutes. The mixture was warmed to room temperature and stirred for 2 hours. The ether was removed under vacuum and the residues extracted with 50 mL toluene. The toluene mixture was filtered through Celite to remove LiCl and the toluene removed under vacuum. The oily residues were dissolved in pentane, filtered through Celite, and the solvent removed to give a clear yellow oil. The oil is a 1:1 mixture of rac and meso. $^1$H NMR ($C_6D_6$) δ6.49 (m, 4), 5.48 (m, 2), 5.39 (m, 2), 5.25 (m, 2), 5.20 (m, 2), 2.59 (m, CH$_2$, 8), 1.62 (m, CH$_2$, 8), 0.96 (m, CH$_3$, 12), 0.20 (s, SiMe, 3), 0.18 (s, SiMe, 6), 0.16 (s, SiMe, 3), –0.08 (s, ZrMe, 3), –0.17 (s, ZrMe, 6), –0.23 (s, ZrMe, 3).

Example 4

Preparation of Silica Bound Aluminum (—Si—O—Al(C$_6$F$_5$)$_2$)

11.50 g of silica (Davison 948, calcined at 600° C. available from W. R. Grace, Davison Division, Baltimore, Md.) was slurried in 300 mL of toluene in a 500 mL round bottom flask and solid Al(C$_6$F$_5$)$_3$.toluene (5.706 g, 24.90 mmol) added. The mixture was heated to 85° C. for 1 hour then left to cool overnight (20 hours). The silica bound aluminum was isolated by filtration and dried for 6 hours under vacuum (yield, 13.81 g).

Example 5

Preparation of Catalyst A

To 1.000 g of silica bound aluminum (from Example 4) in 20 mL of toluene was added Hf-HN3 (0.056 g, 0.080 mmol) (from Example 2) in 5 mL of toluene. The mixture was stirred for 30 minutes. The silica turned orange-red from colorless. The silica was isolated by filtration and dried under vacuum for 6 hours (yield, 1.041 g). The final transition metal loading was 76 μmol/g.

Example 6

Preparation of Catalyst B

To 1.000 g of silica bound aluminum (from Example 4) in 20 mL of toluene was added DMSP-Me$_2$ (0.031 g, 0.079 mmol) (from Example 3) in 5 mL of toluene. The mixture was stirred for 30 minutes. The silica turned orange-red from colorless. The silica was isolated by filtration and dried under vacuum for 6 hours (yield, 1.059 g). The final transition metal loading was 76 μmol/g.

Example 7

Preparation of Catalyst C (Mixture)

To 2.000 g of silica bound aluminum (from Example 4) in 40 mL of toluene was added Hf-HN3 (0.098 g, 0.140 mmol) (from Example 2) and DMSP-Me$_2$ (0.008 g, 0.20 mmol) (from Example 3). The mixture was stirred for 30 minutes. The silica turned orange-red from colorless. The silica was isolated by filtration and dried under vacuum for 6 hours (yield, 2.065 g). The final transition metal loading was 76 μmol/g.

Example 8

Slurry-Phase Ethylene Polymerization with Catalyst A

Polymerization was performed in the slurry-phase in a 1-liter autoclave reactor equipped with a mechanical stirrer, an external water jacket for temperature control, a septum inlet, a vent line, and a regulated supply of dry nitrogen and ethylene. The reactor was dried and degassed at 160° C. Triisobutyl aluminum (100 μL) was added as a scavenger using a gas tight syringe followed by isobutane (400 mL) diluent. The reactor was heated to 85° C. 0.025 g of finished Catalyst A was added with ethylene pressure and the reactor was pressurized with 124 psi (975 kPa) of ethylene. The polymerization was continued for 40 minutes while maintaining the reactor at 85° C. and 124 psi (975 kPa) by constant ethylene flow. The reaction was stopped by rapid cooling and vented. 9.2 g of polyethylene was obtained (FI=no flow, activity=879 g polyethylene/mmol catalyst.atm.h).

Example 9

Slurry-Phase Ethylene Polymerization with Catalyst B

Polymerization was performed in the slurry-phase in a 1-liter autoclave reactor equipped with a mechanical stirrer, an external water jacket for temperature control, a septum inlet, a vent line, and a regulated supply of dry nitrogen and ethylene. The reactor was dried and degassed at 160° C. Triisobutyl aluminum (100 μL) was added as a scavenger using a gas tight syringe followed by isobutane (400 mL) diluent. The reactor was heated to 85° C. 0.025 g of finished Catalyst B was added with ethylene pressure and the reactor was pressurized with 122 psi (959 kPa) of ethylene. The polymerization was continued for 40 minutes while maintaining the reactor at 85° C. and 122 psi (959 kPa) by constant ethylene flow. The reaction was stopped by rapid cooling and vented. 74.7 g of polyethylene was obtained (MI=193, activity=7250 g polyethylene/mmol catalyst.atm.h).

Example 10

Slurry-Phase Ethylene Polymerization with Catalyst C

Polymerization was performed in the slurry-phase in a 1-liter autoclave reactor equipped with a mechanical stirrer, an external water jacket for temperature control, a septum inlet, a vent line, and a regulated supply of dry nitrogen and ethylene. The reactor was dried and degassed at 160° C. Triisobutyl aluminum (100 μL) was added as a scavenger using a gas tight syringe followed by isobutane (400 mL) diluent. The reactor was heated to 85° C. 0.025 g of finished Catalyst C was added with ethylene pressure and the reactor was pressurized with 123 psi (967 kPa) of ethylene. The polymerization was continued for 40 minutes while maintaining the reactor at 85° C. and 123 psi (967 kPa) by constant ethylene flow. The reaction was stopped by rapid cooling and vented. 17.2 g of polyethylene was obtained (Fl=10.9, activity=1656 g polyethylene/mmol catalyst.atm.h).

While the present invention has been described and illustrated by reference to particular embodiments, those of ordinary skill in the art will appreciate that the invention lends itself to variations not necessarily illustrated herein. For example, it is contemplated that two or more supported Group 15 containing catalyst compositions of the invention can be used with an unsupported bulky ligand metallocene-type catalyst compound. For this reason, then, reference should be made solely to the appended claims for purposes of determining the true scope of the present invention.

We claim:

1. A supported catalyst system comprising: a Group 15 containing metal catalyst compound, a bulky ligand metallocene catalyst compound, a Lewis acid aluminum containing activator and a carrier, wherein the Lewis acid aluminum containing activator is represented by the following formula:

$$R_nAl(ArHal)_{3-n},$$

wherein R is a monoanionic ligand;
ArHal is a halogenated $C_6$ aromatic or higher carbon number polycyclic aromatic hydrocarbon or aromatic ring assembly in which two or more rings are joined directly to one another or together; and
n=1 or 2.

2. The supported catalyst system of claim 1 wherein the Group 15 containing metal catalyst compound is a Group 15 containing bidentate or tridentate ligated metal catalyst compound.

3. The supported catalyst system of claim 1 wherein the Group 15 containing metal catalyst compound and the bulky ligand metallocene catalyst compound are contacted with the Lewis acid aluminum containing activator to form a reaction product that is then contacted with the carrier.

4. The supported catalyst system of claim 1 wherein the carrier and the Lewis acid aluminum containing activator are combined to form a support bound, neutral Lewis acid aluminum containing activator having at least one ligand covalently bound to a support material.

5. The supported catalyst system of claim 4 wherein the support material is a polymeric support or a metal or a metalloid oxide support.

6. The supported catalyst system of claim 4 wherein the at least one ligand is a heteroatom that is covalently bound to the support material.

7. The supported catalyst system of claim 4 wherein the Lewis acid aluminum containing activator further comprises at least two halogenated aryl ligands.

8. The supported catalyst system of claim 1 wherein the supported catalyst system further comprises alumoxane.

9. A method of making a supported catalyst system, method comprising the steps of:
(a) combining a Group 15 metal containing catalyst compound and a bulky ligand metallocene catalyst compound;
(b) combining a support material with a Lewis acid aluminum containing activator represented by the formula:

$$R_nAl(ArHal)_{3-n},$$

wherein R is a monoanionic ligand;
ArHal is a halogenated $C_6$ aromatic or higher carbon number polycyclic aromatic hydrocarbon or aromatic ring assembly in which two or more rings are joined directly to one another or together; and
n=1 or 2; and
(c) combining (a) and (b).

10. The method of claim 9 wherein in step (b) the Lewis acid aluminum containing activator is covalently bound to the support material.

* * * * *